(12) United States Patent
Serio et al.

(10) Patent No.: US 7,241,323 B2
(45) Date of Patent: Jul. 10, 2007

(54) PYROLYSIS PROCESS FOR PRODUCING FUEL GAS

(75) Inventors: Michael A. Serio, Sturbridge, MA (US); Erik Kroo, Glastonbury, CT (US); Marek A. Wojtowicz, Simsbury, CT (US); Eric M. Suuberg, Barrington, RI (US)

(73) Assignee: Advanced Fuel Research, Inc., East Hartford, CT (US)

( * ) Notice: Subject to any disclaimer, the term of this patent is extended or adjusted under 35 U.S.C. 154(b) by 5 days.

(21) Appl. No.: 11/328,921

(22) Filed: Jan. 10, 2006

(65) Prior Publication Data

US 2006/0185245 A1   Aug. 24, 2006

Related U.S. Application Data

(62) Division of application No. 09/902,425, filed on Jul. 10, 2001, now Pat. No. 7,169,197.

(51) Int. Cl.
*C01B 3/46* (2006.01)

(52) U.S. Cl. .............................. 48/197 R; 48/61; 48/71; 48/72; 48/73; 48/77; 48/98; 48/111; 48/62 R; 48/209; 48/210; 423/651; 423/644; 422/164; 422/184; 422/185; 422/193; 422/198; 422/211; 422/212; 422/232; 422/236

(58) Field of Classification Search .............. 48/197 R, 48/61, 71, 72, 73, 77, 98, 62 R, 209, 111, 48/210; 423/651, 644; 422/164, 184, 185, 422/193, 198, 211, 212, 232, 236
See application file for complete search history.

(56) References Cited

U.S. PATENT DOCUMENTS

| | | | | | |
|---|---|---|---|---|---|
| 3,816,298 | A | * | 6/1974 | Aldridge | ..................... 208/112 |
| 4,421,524 | A | * | 12/1983 | Chittick | ....................... 48/209 |
| 5,114,541 | A | * | 5/1992 | Bayer | ......................... 201/2.5 |
| 5,519,605 | A | * | 5/1996 | Cawlfield | .................... 700/31 |
| 5,993,751 | A | * | 11/1999 | Moriarty et al. | ............ 422/233 |

* cited by examiner

*Primary Examiner*—Glenn A. Caldarola
*Assistant Examiner*—Vinit H. Patel
(74) *Attorney, Agent, or Firm*—Ira S. Dorman

(57) ABSTRACT

Solid waste resource recovery in space is effected by pyrolysis processing, to produce light gases as the main products ($CH_4$, $H_2$, $CO_2$, CO, $H_2O$, $NH_3$) and a reactive carbon-rich char as the main byproduct. Significant amounts of liquid products are formed under less severe pyrolysis conditions, and are cracked almost completely to gases as the temperature is raised. A primary pyrolysis model for the composite mixture is based on an existing model for whole biomass materials, and an artificial neural network models the changes in gas composition with the severity of pyrolysis conditions.

18 Claims, 5 Drawing Sheets

PYROLYSIS PROCESS FOR PRODUCING FUEL GAS

CROSS-REFERENCE TO RELATED APPLICATION

This application is a divisional of application Ser. No. 09/902,425, filed Jul. 10, 2001, now U.S. Pat. No. 7,169,197 the entire specification of which is incorporated hereinto by reference thereto.

STATEMENT REGARDING GOVERNMENT INTEREST

The United States Government has rights in this invention under NASA Contracts NAS2-99001 and NAS2-00007.

BACKGROUND OF THE INVENTION

The NASA objective of expanding the human experience into the far reaches of space will require the development of regenerable life support systems. A key element of these systems is a means for solid waste resource recovery. The objective of this invention is to demonstrate the feasibility of pyrolysis processing as a method for the conversion of solid waste materials in a Controlled Ecological Life Support System (CELSS). A pyrolysis process will be useful to NASA in at least four respects: 1) it can be used as a pretreatment for a combustion process; 2) it can be used as a more efficient means of utilizing oxygen and recycling carbon and nitrogen; 3) it can be used to supply fuel gases to fuel cells for power generation; and 4) it can be used as the basis for the production of chemicals and materials in space.

A key element of a CELSS is a means for solid waste resource recovery. Solid wastes will include inedible plant biomass (IPB), paper, plastic, cardboard, waste water concentrates, urine concentrates, feces, etc. It would be desirable to recover usable constituents such as $CO_2$, $H_2O$, hydrogen, nitrogen, nitrogen compounds, and solid inorganics. Any unusable byproducts should be chemically and biologically stable and require minimal amounts of storage volume.

Many different processes have been considered for dealing with these wastes: incineration, aerobic and anaerobic biodigestion, wet oxidation, supercritical water oxidation, steam reforming, electrochemical oxidation and catalytic oxidation. However, some of these approaches have disadvantages which have prevented their adoption. For example, incineration utilizes a valuable resource, oxygen, and produces undesirable byproducts such as oxides of sulfur and nitrogen. Incineration also will immediately convert all of the waste carbon to $CO_2$, which will require storing excess $CO_2$.

"Pyrolysis," in the context of this application, is defined as thermal decomposition in an oxygen-free environment. Primary pyrolysis reactions are those which occur in the initial stages of thermal decomposition, while secondary pyrolysis reactions are those which occur upon further heat treatment. A pyrolysis based process has several advantages when compared to other possible approaches for solid waste resource recovery: 1) it can be used for all types of solid products and can be more easily adapted to changes in feedstock composition than alternative approaches; 2) the technology is relatively simple and can be made compact and lightweight and thus is amenable to spacecraft operations; 3) it can be conducted as a batch, low pressure process, with minimal requirements for feedstock preprocessing; 4) it can produce several usable products from solid waste streams (e.g., $CO_2$, $CO$, $H_2O$, $H_2$, $NH_3$, $CH_4$, etc.); 5) the technology can be designed to produce minimal amounts of unusable byproducts; 6) it can produce potentially valuable chemicals and chemical feedstocks (e.g., nitrogen rich compounds for fertilizers, monomers, hydrocarbons); and 7) pyrolysis will significantly reduce the storage volume of the waste materials while important elements such as carbon and nitrogen can be efficiently stored in the form of pyrolysis char and later recovered by gasification or incineration when needed. In addition to being used as the primary waste treatment method, pyrolysis can also be used as a pretreatment for more conventional techniques, such as incineration or gasification.

The primary disadvantages of pyrolysis processing are: 1) the product stream is more complex than for many of the alternative treatments; and 2) the product gases cannot be vented directly in the cabin without further treatment because of the high CO concentrations. The former issue is a feature of pyrolysis processing (and also a potential benefit, as discussed above). The latter issue can be addressed by utilization of a water gas shift reactor or by introducing the product gases into an incinerator or high temperature fuel cell.

SUMMARY OF THE INVENTION

It is a primary object of the present invention to provide a novel process and system by which non-gaseous hydrocarbonaceous materials, and particularly mixed solid waste materials, can be converted to usable gases, as the main products, and to a reactive carbon-rich char as the main byproduct.

More specific objects of the invention are, as noted above, to provide such a process which is feasible for use in a controlled ecological life support system, and to provide a system in which the process is implemented.

It has now been found that certain of the foregoing and related objects are attained by the provision of a process for producing fuel gases from at least one non-gaseous hydrocarbonaceous material, using a two-stage reaction apparatus, comprising the following steps, carried out cyclically:

(a) introducing a non-gaseous hydrocarbonaceous material into a pyrolysis chamber, comprising a first stage of the apparatus, and pyrolyzing the hydrocarbonaceous material therein, usually at a temperature of about 600° to 900° C. (but necessarily substantially lower that the second stage temperature), so as to produce a primary fuel gas mixture, a pyrolysis liquid (condensed hydrocarbons), and a first carbonaceous residue;

(b) introducing the primary fuel gas mixture and pyrolysis liquid into a second chamber, comprising a second stage of the apparatus and containing a silica gel-based catalyst, and heating the liquid therein, in a substantially non-oxidizing atmosphere, to a temperature of about 900° to 1100° C., so as to produce additional fuel gases and additional solid carbonaceous residue, without substantially altering the composition of the primary fuel gas mixture;

(c) withdrawing the primary fuel gas mixture and the additional fuel gas from the second chamber; and (d) introducing air, oxygen, carbon dioxide or steam into each of the chambers to effect reaction with, and at least partial removal of, the carbonaceous residue therein.

The primary fuel gas mixture produced by pyrolysis will usually consist primarily of carbon monoxide, methane, and hydrogen. Steam, carbon dioxide, or a mixture thereof will preferably be introduced into each chamber so as to produce further quantities of fuel gas, and advantageously to effect regeneration of the catalyst in the second chamber as well.

In most embodiments, the steps of the process will be controlled by electronic data processing means, programmed to monitor the formation of at least one gas phase intermediate product, and preferably to monitor at least three such products. The gaseous product or products monitored will normally be selected from the group consisting of hydrogen, methane, carbon monoxide, carbon dioxide, water, and oxygen, and they may constitute intermediate or final products. The data processing means will generally be programmed to determine the concentrations of the gas phase constituents, and to implement an artificial neural network model based thereupon, the concentrations determined being utilized as input data to the network. The neural network model will normally be constructed to produce a fuel gas product of selected composition, from a specified hydrocarbonaceous material, by controlling the operating parameters for the first and second stages of the apparatus.

Other objects of the invention are attained by the provision of a power generation system comprising a gas-fueled power generator; two-stage reaction apparatus for producing a fuel gas product from a hydrocarbonaceous material, operatively connected to supply fuel gas to the power generator; and means for controlling the flow of fuel gas from the reaction apparatus to the generator, the reaction apparatus being constructed for effecting the cyclical fuel gas-producing process herein described. Normally, the system will include electronic data processing means for controlling the steps of the process, programmed to monitor gas phase products in the manner set forth.

DETAILED DESCRIPTION OF SPECIFIC AND PREFERRED EMBODIMENTS

Figure 1:
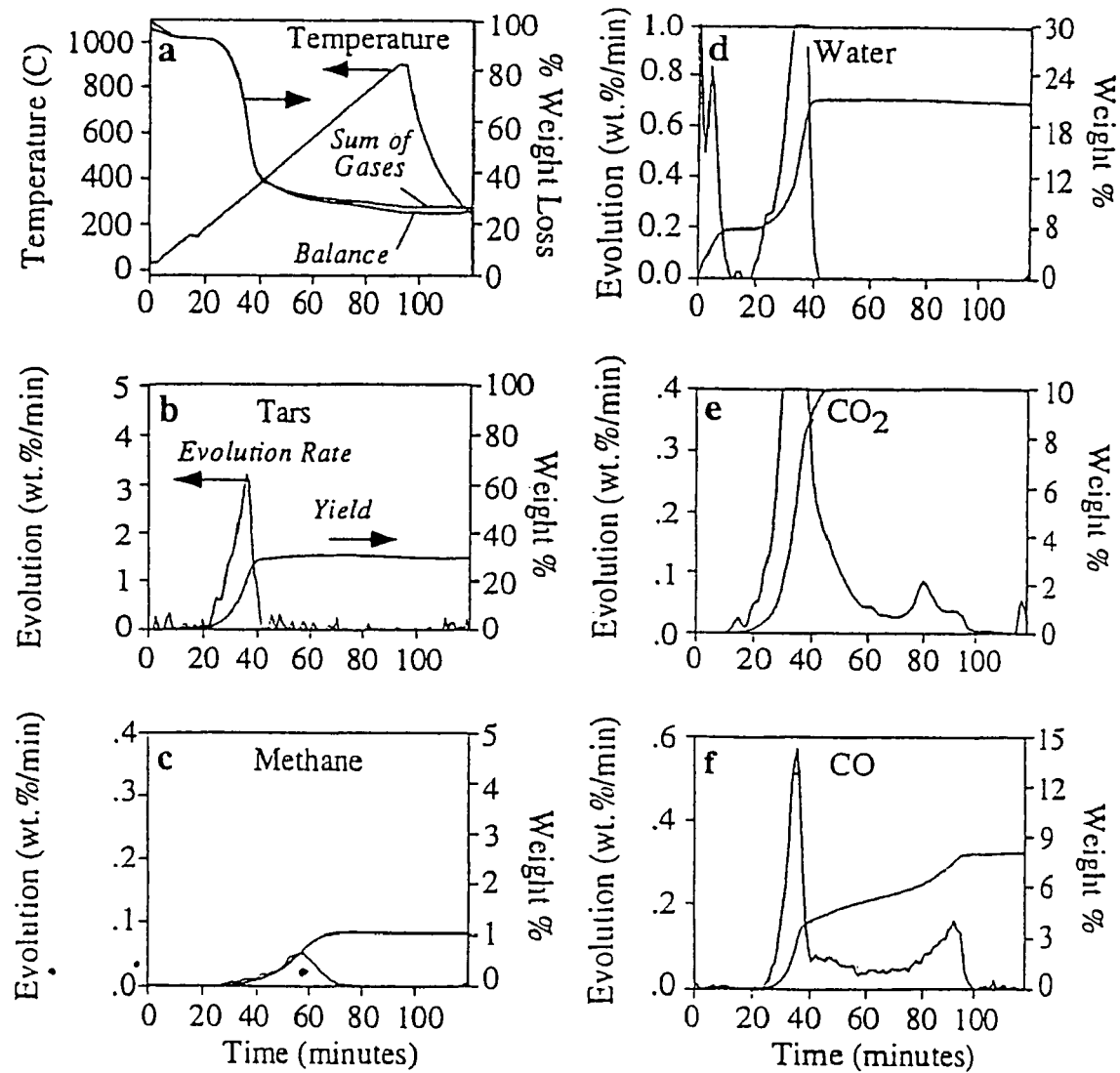
FIG. 1 comprises curves of TG-FTIR pyrolysis data for major products for NIST Wheat Straw at 10° C./min; a) time-temperature history, balance curve from TGA (thermogravimetric analyzer) and sum of gases from FT-IR; b-f differential and cumulative evolution curves for major volatile products.

A model waste feedstock was used, consisting of 10 wt. % polyethylene, 15% urea, 25% cellulose, 25% wheat straw, 10% of a coconut oil soap, i.e., sodium methyl cocyl taurate (Gerepon TC-42), and 5% methionine. The materials that were obtained and the elemental compositions of each are given in Table 1. The samples in Table 1 were obtained and subjected to thermogravimetric analysis with FT-IR analysis of evolved gases (TG-FTIR) at 10° C./min and 30° C./min. Details of the TG-FTIR method can be found in the prior art. The apparatus consists of a sample suspended from a balance in a gas stream within a furnace. As the sample is heated, the evolving volatile products are carried out of the furnace directly into a 5 cm diameter gas cell (heated to 150° C.) for analysis by FT-IR.

TABLE 1

Elemental Analysis of Individual and Composite Samples (wt. %)

| Sample | Basis | Moisture | Ash | C | H | O | S | N |
|---|---|---|---|---|---|---|---|---|
| Polyethylene[a] (Aldrich) | DAF | | | 85.7 | 14.3 | 0.0 | 0.0 | 0.0 |
| Cellulose[b] (Avicel PH-102) | AR | 5.0 | | | | | | |
| | D | | <0.05 | 44.0 | 6.2 | 49.8 | ~0.0 | ~0.0 |
| | DAF | | | 44.0 | 6.2 | 49.8 | ~0.0 | ~0.0 |
| Wheat Straw[b] (NIST) | AR | 7.9 | | | | | | |
| | D | | 9.0 | 43.7 | 5.6 | 40.9 | 0.2 | 0.6 |
| | DAF | | | 48.0 | 6.2 | 44.9 | 0.2 | 0.7 |
| Urea[a] (Aldrich) | DAF | | | 20.0 | 6.7 | 26.6 | 0.0 | 46.7 |
| Gerepon[c] TC-42 (Rhône-Poulenc) | D | | 7.6 | 55.9 | 10.6 | 10.6 | 10.6 | 4.7 |
| | DAF | | | 60.5 | 11.5 | 11.5 | 11.5 | 5.0 |
| Methionine[a] (Aldrich) | DAF | | | 40.3 | 7.4 | 21.4 | 21.5 | 9.4 |
| Composite | D | | 3.8 | | | | | |
| | DAF | | | 48.7 | 8.2 | 31.0 | 3.4 | 8.7 |

Notes:
AR = As-received; D = Dry; DAF = Dry, Ash Free
[a] = determined from chemical formula
[b] = determined by Huffman Laboratories (Golden, CO)
[c] = estimated from approximate chemical formula In the standard analysis procedure, a ~35 mg sample is taken on a 30° C./min temperature excursion in helium, first to 150° C. to dry, then to 900° C. for pyrolysis. After cooling, a small flow of $O_2$ is added to the furnace and the temperature is ramped to 700° C. (or higher) for oxidation in order to measure the inorganic residue. The TG-FTIR system can also be operated with a post pyrolysis attachment to examine secondary pyrolysis of the volatile species (see below).

During these excursions, infrared spectra are obtained approximately once every forty-one seconds. The spectra show absorption bands for infrared active gases, such as CO, $CO_2$, $CH_4$, $H_2O$, $C_2H_4$, HCl, $NH_3$, and HCN. The spectra above 300° C. also show aliphatic, aromatic, hydroxyl, carbonyl and ether bands from tar (heavy liquid products). The evolution rates of gases derived from the IR absorbance spectra are obtained by a quantitative analysis program. The aliphatic region is used for the tar evolution peak. Quantitative analysis of tar is performed with the aid of the weight-loss detain the primary pyrolysis experiments.

The TG-FTIR method provides a detailed characterization of the gas and liquid compositions and kinetic evolution rates from pyrolysis of materials under a standard condition. While the heating rates are slower (3-100° C./min) than what is used in many practical processes, it is a useful way of benchmarking materials and was used in this study for characterizing both the primary and secondary pyrolysis behavior of the model waste samples and the individual components.

Measurements of the thermodynamics of the pyrolysis process were made using differential scanning calorimetry (DSC). The DSC experiments were done by heating at 10, 30 and 60° C./min. These heating rates were the same or similar to the heating rates used in the TG-FTIR experiments, so a direct comparison could be made. A TA Instruments 2910 DSC system, with a maximum operating temperature of 600° C., was employed in the DSC work. The sample cell was operated under a nitrogen flow rate of 100 $cm^3$/min in order to keep the cell free of oxygen during the measurements. In preliminary work, this was noted to be important. Small amounts of oxygen, participating in a combustion reaction, can significantly influence the thermal characteristics of the process.

Aluminum sample pans were used for the DSC experiments in a partially sealed mode. This was done by pushing down the top sample pan cover gently onto the bottom pan containing the sample. Following this, three small pinholes were poked into the sample pan to allow a limited amount of mass loss from the pan. This configuration gives results which are consistent with pyrolysis in a confined system with a slow rate of mass bleed out of the system, and are regarded to be reasonably representative of a pyrolysis processing system. Typically, about 10 mg of sample was used in an experiment. In many cases, particularly with charring samples, the initial DSC run was followed by a cooling of the sample to room temperature, followed by a retrace of the original heating profile. This procedure provides a background trace attributable to the heat capacity of the char residue. In cases involving formation of a char residue, the mass loss of the sample during the first heating was also established. These values were compared with the TG-FTIR results, to verify whether the pyrolysis was occurring in a consistent manner, or in a different manner due to the increased mass transport resistance in the DSC pans.

TG-FTIR Results for Primary Pyrolysis

Figure 2:
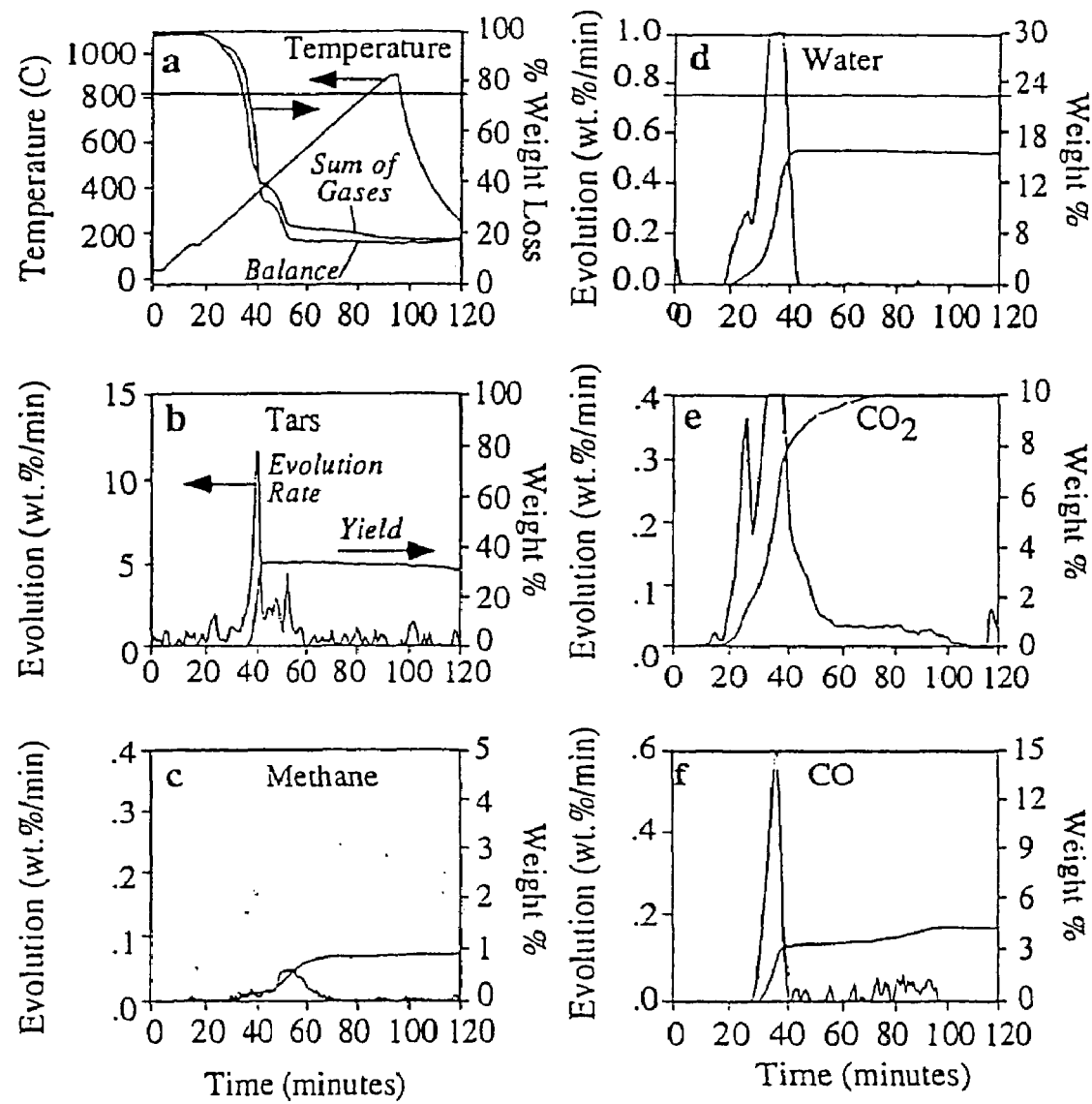
FIG. 2 comprises curves of TG-FT-IR pyrolysis data for major products for composite mixture at 10° C./min; a) time-temperature history, balance curve from TGA and sum of gases from FT-IR; b-f) differential and cumulative evolution curves for major volatile products.

Examples of some representative data are shown in FIGS. 1 and 2 for the wheat straw sample and for the composite mixture, respectively. These results are for runs done at 10° C./min. For each of the samples, the data are plotted in a six panel format. In each case, the panels include (a) temperature, sum of gases (top curve), and weight loss (bottom curve) and (b-f) the differential and integral yields of tar, $CH_4$, H2O, $CO_2$, and CO as major pyrolysis products. In most cases, the minor pyrolysis products which are routinely quantified and plotted include $SO_2$, $C_2H_4$, $CS_2$, $NH_3$, COS, and olefins. In many cases, the amounts of these latter product are barely above the noise level. Hydrogen is not reported since the gas is not IR active. However, only small amounts of hydrogen are formed in primary pyrolysis experiments (<1 wt. %). It can be an important product from secondary pyrolysis experiments and for these experiments, the FT-IR measurements were supplemented by gas chromatography (GC) (see below).

Wheat straw—As expected, wheat straw produces oxygenated gases in addition to tar. However, the wheat straw produces about 20-25 wt. % char (fixed carbon plus ash) on an as-received basis. The formation of fixed carbon from whole biomass is known to result primarily from the aromatic lignin component of the plant, which typically comprises 20-25% by weight, with the remainder being primarily cellulose and hemicellulose. Previous work has shown that the weight loss from pyrolysis for whole biomass samples can be understood as a linear superposition of these three main components to a first approximation. However, one can not predict the yields of individual gas species using this approach, probably due to the catalytic effects of the trace minerals present in whole biomass.

Composite mixture—The results for TG-FTIR runs with the composite mixture are shown in FIG. 2. In terms of product distribution (char, tar, gas), the results are much more similar to the wheat straw sample than the cellulose, polyethylene, Gerepon, methionine, or urea samples. This result makes sense in that the wheat straw is also a multi-component mixture which consists of cellulose, hemi-cellulose, and lignin, while the composite mixture is made up of 25% cellulose and 25% wheat straw as the largest components. The wheat straw sample also has an elemental composition which is relatively close to that of the composite mixture (see Table 1). Therefore, one might expect similar pyrolysis behavior.

DSC Experiments

The general conclusion which can be drawn from these measurements is that the composite mixture pyrolysis is only mildly endothermic (of order 100 J/g), under conditions in which a significant amount of mass loss is permitted to occur during pyrolysis. Confining pyrolysis more completely might be expected to drive the process in an even more exothermic direction, as it does in the case of pure cellulose. In any event, it may be noted that, in comparison to this relatively modest enthalpy of pyrolysis, the sensible enthalpy for heating the sample is quite a bit larger. For example, using a "typical" average heat capacity for cellulose of 2 J/g-K to represent the composite mixture, it may be seen that heating from room temperature to 600° C. will itself require 1150 J/g of sample. Additionally, the heat required to evaporate any residual moisture content could also far outweigh this small pyrolysis thermal demand. Thus, it may be concluded that the heat of pyrolysis will not be of significant design concern unless conditions far removed from these are to be explored. Most of the heat input required will be to overcome heat losses from the reactor.

CHAR Characterization

Reactivity measurements were made using indices known as $T_{critical}$ and $T_{late}$. These measure the temperature at which a char heated at 30° C./min in air achieves a reaction rate of 6.5% per min in the early stage of reaction and where it returns to that value in the later stages. Low values of $T_{critical}$ and $T_{late}$ indicate a reactive material, and vice versa. Some selected results for these indices are included in Table 2 (which follows) for the composite mixture chars. These values are comparable and indicate that these chars are very reactive and would be easy to gasify or combust in order to recover additional carbon and nitrogen. The same conclusions were reached in more extensive char characterization studies previously carried out, which also included characterization of pore structure.

From the initial pore structure characterization work performed on the composite waste chars, it appears that they have porosity characteristics similar to those encountered with pyrolysis of woods. Surface areas and accessible porosity are both quite low. It is expected that extending measurements to samples of waste-derived char materials that have been oxidized to a significant degree will establish whether the waste-derived chars develop significant porosity, just as do the wood chars. This can have important consequences not only for the reactivity of the char in gasification, but also in the possible further useful application of these materials (e.g., as adsorbents) in a space cabin environment.

TG-FTIR Experiments with the Post Pyrolyzer (TG-FTIR/PP)

The TG-FTIR system was used as discussed above to characterize the primary pyrolysis behavior of the individual components and the composite sample. In this phase, the system was also equipped with a post-pyrolysis system (isothermal secondary pyrolysis unit) in order to study the cracking of the heavy liquids (tars) and other volatiles that are formed during pyrolysis of these materials. This post-pyrolysis unit can be operated from 500-1000° C. with an average volatile residence time of 0.4-2.6 seconds at atmospheric pressure. Under the right pyrolysis conditions, the liquids are cracked to produce primarily CO, $CO_2$, $CH_4$, $H_2$, $H_2O$, and small amounts of carbon.

The experiments were done with the TG-FTIR/PP system over the temperature range from 600-1000° C. in the post pyrolyzer. The helium gas flow rate through the 14 $cm^3$ volume post pyrolyzer for the "fast" runs was ~400 $cm^3$/min (at standard conditions). Additional runs were done at lower flow rates (~100 $cm^3$/min) in order to test the effect of this variable and also to provide gas concentration levels that would allow for simultaneous measurements by FT-IR and GC. Over a temperature range of 600-1000° C., these gas flow rates correspond to a range of residence times for the fast flow conditions of 0.4 to 0.6 second and 1.8 to 2.6 seconds for the slower flow conditions; i.e., the flow rates were not adjusted to equalize the residence times at each temperature.

The TG-FTIR/PP experiments were done for both the composite mixture sample and also the wheat straw sample. A set of results for the composite mixture, shown in Table 2, demonstrate the very strong effect of the post pyrolysis temperature on the product composition. As the post pyrolysis temperature increases, the tar yields decline to zero and the CO yields increase dramatically. The $CH_4$, $H_2O$ and $CO_2$ yields go through a maximum. Similar results are observed for post-pyrolysis runs done with the pure wheat straw sample. In order to get yield data on $H_2$, the GC (gas chromatograph) system was used to take periodic samples.

TABLE 2

Results of TG-FTIR/Post Pyrolyzer Experiments for the Composite Mixture

| | Temperature ° C. | | | | | | | | | |
|---|---|---|---|---|---|---|---|---|---|---|
| Temp. | 600° C. | | 700° C. | | 800° C. | | 900° C. | | 1000° C. | |
| Flow Rate | Slow | Fast | Slow | Fast | Slow | Fast | Slow | Fast | Slow | Fast |
| Moisture | | 3.1 | | 3.9 | 3.9 | 4.5 | 9.1 | 6.8 | 9.9 | 4.9 |
| Volatiles | | 87.0 | | 81.9 | 56.0 | 80.8 | 75.2 | 75.5 | 74.7 | 77.8 |
| Fixed Carbon | | 11.9 | | 12.8 | 9.2 | 11.3 | 12.8 | 12.2 | 11.9 | 11.3 |
| Ash | | 2.0 | | 1.4 | 30.9 | 3.4 | 3.0 | 5.5 | 3.5 | 6.0 |
| Tars | | 30.2 | | 0.5 | 0.0 | 0.0 | 1.1 | 0.0 | 1.1 | 0.0 |
| $CH_4$ | | 1.63 | | 3.85 | 7.69 | 6.56 | 7.97 | 5.0 | 6.44 | 4.10 |
| $H_2O$ (pyr) | | 18.32 | | 17.34 | 11.11 | 18.52 | 11.02 | 13.43 | 8.02 | 12.50 |
| $H_2$ | | | | | 1.92 | | 4.61 | | 7.54 | |
| $CO_2$ | | 10.60 | | 13.40 | 17.77 | 15.07 | 22.40 | 13.16 | 21.60 | 15.80 |
| CO | | 6.14 | | 23.51 | 15.66 | 22.62 | 30.20 | 23.80 | 45.50 | 36.15 |
| $NH_3$ | | 0.85 | | 0.88 | 0.36 | 0.68 | 0.38 | 0.48 | 0.39 | 0.22 |
| $C_2H_4$ | | 4.45 | | 16.26 | 6.95 | 11.08 | 1.88 | 5.05 | 0.92 | 2.06 |
| COS | | 0.35 | | 0.54 | 0.46 | 0.49 | 0.45 | 0.61 | 0.60 | 0.46 |
| $SO_2$ | | 0.91 | | 0.80 | 0.00 | 0.70 | 0.43 | 0.94 | 0.84 | 0.87 |
| CHNO | | 1.40 | | 2.12 | 0.06 | 0.09 | 0.01 | 0.26 | 0.02 | 0.34 |
| $C_3H_3N_3O_3$ | | 0.01 | | 0.00 | 0.00 | 0.00 | 0.01 | 0.00 | 0.00 | 0.00 |
| $C_4H_{11}NS$ | | 5.28 | | 4.49 | 0.00 | 0.00 | 0.00 | 0.00 | 0.00 | 0.00 |
| $T_{critical}$ | | 346 | | 374 | 362 | 384 | 414 | 381 | 360 | 378 |
| $T_{late}$ | | 512 | | 493 | 470 | 500 | 444 | 500 | 398 | 498 |

Notes:
Yields are given on an as-received wt. % basis; in cases where two experiments are done, the results are averaged; $H_2$ yields are from GC measurements; fast flow rate was ~400 $cm^3$/min at standard conditions (0.4-0.6 second residence times), while the slow flow rate was ~100 $cm^3$/min (1.8-2.6 second residence times); $T_{critical}$ and $T_{late}$ are indices of the char reactivity (see above).

The $H_2$ measurements were made for selected experiments. Since the GC was not used to monitor the entire evolution profile, the complete $H_2$ yield was calculated by using the $CH_4$ and CO yields as internal standards, since these gases are measured both by FT-IR and GC. In order to estimate the $H_2$ yields for experiments where no GC measurements are made, a correlation was made between the existing $H_2$ yield data and the CO yields. Although this correlation consisted of only three points, it was linear over a wide range of CO and $H_2$ concentrations and was used to interpolate the results for the remainder of the experiments in Table 2. Based on these estimates, the change in the molar gas composition for the fast flow experiments with the composite mixture was determined, as shown in Table 3 (excluding the composition of the inert helium carrier gas). The data in Table 3 show that with increasing pyrolysis temperature, the gas composition becomes rich in $H_2$ and CO and that $CH_4$, $CO_2$ and $H_2O$ are also key components. While tars and minor heteroatomic species are present at low temperatures, these are largely eliminated as the temperature increases.

Summary of Effects of Pyrolysis Conditions on Yields

Changes in the char yields were observed in the DSC experiments for the cellulose, polyethylene, and the composite mixture when the degree of confinement was changed in the sample holder, as discussed above. These results, along with the post pyrolysis results in Tables 2 and 3, underscore the significant effect of primary and secondary pyrolysis conditions on the final product mix. There are many variables that can be manipulated for pyrolysis that can be used to compensate for changes in the feedstock composition and/or the desired product yields (e.g., time-temperature history, pressure). This provides a much greater degree of control over the solid waste processing step than is possible for either gasification or incineration. Changing the pyrolysis conditions allows one to effect significant changes in the pyrolysis product distribution (char, tar, gas) and the gas composition. Liquids can be produced if desired (under mild conditions) or cracked to form carbon oxides and fuel gases under severe conditions, depending on what is required for the life support system.

TABLE 3

Estimated Gas Phase Composition (Mole %) from TG-FTIR/Post Pyrolyzer Experiments with the Composite Mixture

| | Temperature ° C. | | | | |
|---|---|---|---|---|---|
| | 600° C. | 700° C. | 800° C. | 900° C. | 1000° C. |
| $CH_4$ | 4 | 5 | 9 | 7 | 5 |
| $H_2O$ | 44 | 20 | 21 | 18 | 12 |
| $H_2$[a] | 11 | 36 | 36 | 42 | 51 |
| $CO_2$ | 11 | 6 | 7 | 7 | 7 |
| CO | 10 | 17 | 17 | 20 | 24 |
| $C_2H_4$ | 7 | 12 | 8 | 4 | 1 |
| $NH_3$ | 2 | 1 | 1 | 1 | <<1 |
| COS | <<1 | <<1 | <<1 | <<1 | <<1 |
| $SO_2$ | <1 | <<1 | <<1 | <<1 | <<1 |
| CHNO | 1 | 1 | 0 | <<1 | <<1 |
| $C_3H_3N_3O3$ | 0 | 0 | 0 | 0 | 0 |
| $C_4H_{11}NS$ | 2 | 1 | 0 | 0 | 0 |
| Tars | 7 | 0 | 0 | 0 | 0 |

Notes:
Data from fast flow condition (400 cm³/min)
[a] estimated from correlation between $H_2$ and CO Modeling of Primary Pyrolysis Most of the composite mixture consists of materials which are polymeric in nature (polyethylene, cellulose, wheat straw). Consequently, the use of modeling approaches that have previously been successful for polymeric materials is appropriate.

Statistical network models—The important processes in the early stages of pyrolysis of polymeric materials are polymerization/depolymerization, cross-linking and gas formation, and it is known that these early processes determine the composition of the products. The geometrical structure of a polymer (whether it is chain like or highly cross-linked) controls how it reacts under otherwise identical chemical reactions. One, therefore, can often use statistical models based on the geometrical structure to predict the reactions of a polymer. Such statistical models have been developed, for example, to describe the thermal decomposition of coal, lignin, and phenol-formaldehyde.

The general model developed to describe thermal decomposition of crosslinked aromatic polymer networks is called the FG-DVC model; it is described in the prior art. In developing the model, extensive experimental work was done with synthetic polymers to allow the study of bond breaking and mass transport in chemically clean systems. The model combines two previously developed models, a Functional Group (FG) model and a Depolymerization-Vaporization-Crosslinking (DVC) model. The DVC subroutine is employed to determine the amount and molecular weight of macromolecular fragments. The lightest of these fragments evolves as tar. The FG subroutine is used to describe the gas evolution and the elemental and Functional Group compositions of the tar and char. In the case of coal or lignin, cross-linking in the DVC subroutine is computed by assuming that this event is correlated with $CO_2$, $CH_4$, and/or $H_2O$ evolutions predicted in the FG subroutine.

Model parameters—The implementation of the FG-DVC model for a complex polymeric material requires the specification of several parameters, some of which can be constrained by the known structural units and some of which are constrained by experimental characterization data. The basic idea is to calibrate the model using simple small scale pyrolysis experiments like TG-FTIR and pyrolysis-Field Ionization Mass Spectrometry (FIMS), and then use the model to make predictions for conditions where experimental data are not readily available.

Modeling of whole biomass—In more recent work, sponsored by the USDA, the FG-DVC model was applied to the pyrolysis of plant biomass samples. A number of biomass samples were considered based on the abundance and availability of agricultural and forestry feedstocks and waste materials in the United States. Six samples were obtained from the National Institute of Standards and Technology's Standard Reference Materials Program which included microcrystalline cellulose (C), sugar cane bagasse (B), wheat straw (WS), corn stalk (CS), softwood *Pinus radiata* (PR), and hardwood *Populous deltoides* (PD). A biomass classification scheme was developed based on comparing the placement of a near reference set of samples on a van Krevelen diagram (plot of H/C vs. O/C atomic ratio).

In the case of whole biomass, the pyrolysis behavior is dominated by the cellulose and hemi-cellulose, non-aromatic, components. Consequently, the DVC model, as currently formulated, is not as useful as in the case of aromatic polymers like coal or lignin. For these types of materials and for mixed waste streams, such as would be found onboard a spacecraft, the FG-DVC model is still used, but the DVC portion has been largely disabled. This means that the ultimate liquid (tar) yield is an adjustable parameter.

The FG-DVC model predictions were compared with the yields and composition of pyrolysis products from the TG-FTIR experiments for whole biomass samples. The model was subsequently used to make predictions of pyrolysis product distributions over a wider range of conditions and compares reasonably well to biomass pyrolysis data obtained at much higher heating rates.

Modeling of pyrolysis of mixed waste streams—The detailed modeling of the pyrolysis of mixed waste streams has not been extensively studied, except for mixtures of whole biomass components (cellulose, hemicellulose, lignin), municipal solid waste, and scrap tire components (carbon black, extender oil, natural rubber, butadiene rubber, and styrene-butadiene rubber). Additive models based on a linear contribution of the component species work reasonably well for overall weight loss but less well for individual pyrolysis yields, especially in the case of biomass. In the present instance, the first task in the modeling work was to use the FG-DVC pyrolysis model to simulate the primary pyrolysis data from the TG-FTIR experiments for the major constituents. The TG-FTIR data are used as generated (see FIGS. 1 and 2), except for the tar evolution rate which is adjusted to reflect any lack of mass balance closure in the original experiment.

Figure 3:
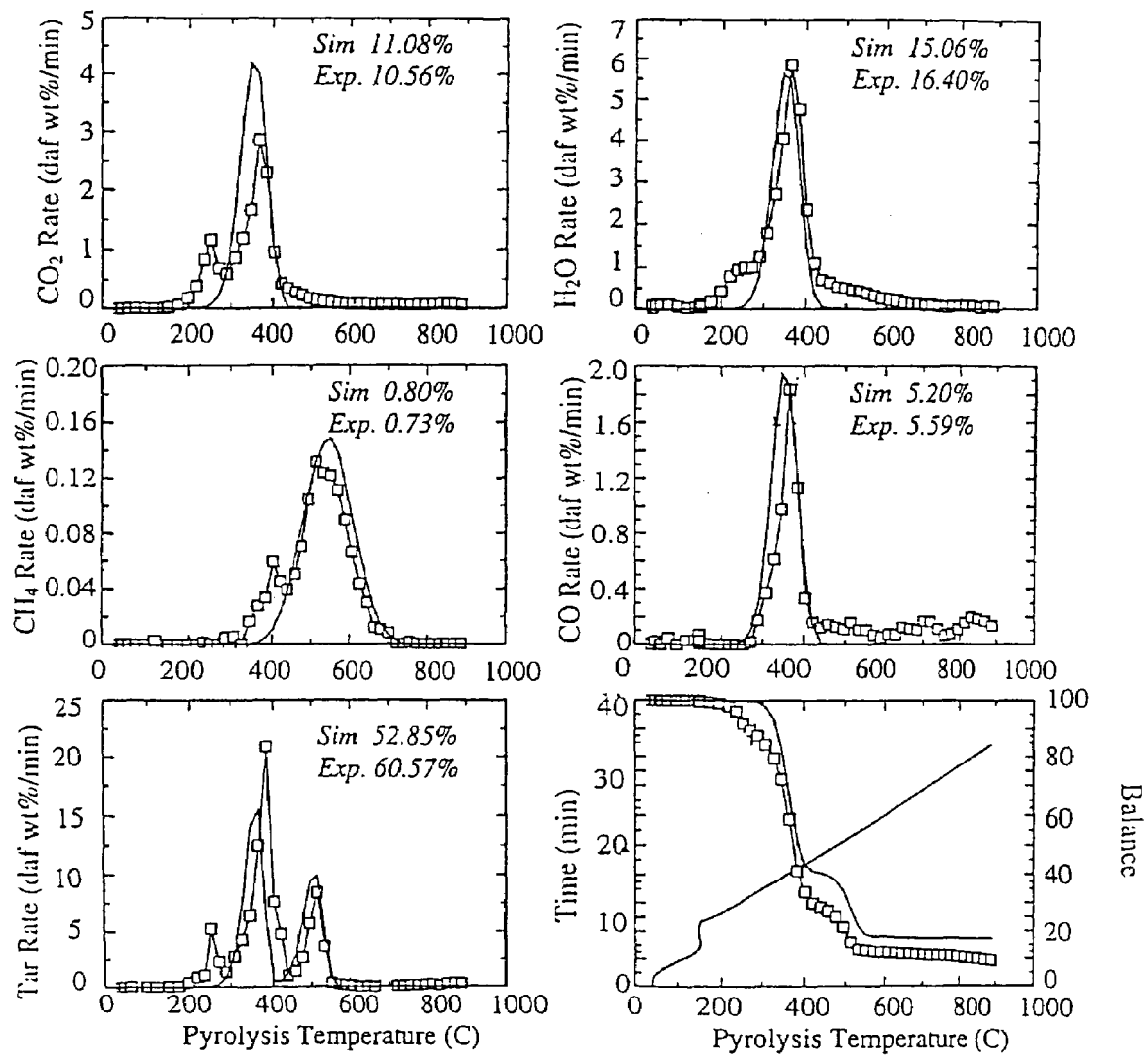
FIG. 3 comprises curves presenting comparisons of FG-DVC model predictions (solid lines) and TG-FT-IR pyrolysis data (symbols connected by lines) (30° C./min) for composite mixture using modified wheat straw input parameters.

In general, the yields of individual products and the overall weight loss were well predicted for wheat straw. The next step was to use the FG-DVC model to simulate the primary pyrolysis data from TG-FTIR experiments with the composite mixture. This was done initially by assuming that the same input parameters as for wheat straw would apply and making a modification to the tar evolution pool to allow for two evolution peaks from the composite mixture (only one tar peak is observed from wheat straw pyrolysis). The predictions and experimental data are compared in FIG. 3 at a heating rate of 30° C./min. Good agreement between the predictions and the experimental data was observed, except for small evolution peaks for $CO_2$, $H_2O$ and $CH_4$. These extra peaks can be easily modeled by adjusting the distribution of gas pools in the model input file. In addition, the model has recently been improved so that equally good fits were obtained using the actual elemental composition for the composite mixture.

Modeling of Primary and Secondary Pyrolysis Behavior

In order to develop the complicated relationship between the composition of the starting materials, the process conditions and the desired product yields, this work has also investigated the use of artificial neural network (ANN) models. Recently, ANNs have been applied to a variety of similarly intractable problems and have demonstrated a high degree of success. The ability of ANNs to learn from observation, together with their inherent ability to model nonlinearity, make them ideally suited to the problem of control in complex pyrolysis processes. It should be possible to use ANNs to adaptively model the pyrolysis process using the process parameters as inputs and the resulting pyrolysis product distributions as outputs. The model would then be used in a feedback control loop to maximize the yields of desirable products while minimizing side reactions. The validation data for the ANN control technology will be the concentrations of pyrolysis species supplied by IR gas analysis equipment.

A basic neural network development software package has been developed for National Instrument's (Austin, Tex.) LabVIEW software. Working in the LabVIEW environment provides for a flexible user interface, and easy access to many types of data. The Neural Network Development for LabVIEW (NNDLab) software includes tools to extract custom data sets directly from VISTA software. Backpropagation networks can be trained and tested using delta rule, delta-bar-delta rule, or extended delta-bar-delta rule paradigms, and could easily be imbedded into dedicated analysis or process control LabVIEW programs. This package was used to control $NO_x$ in a selective non-catalytic reduction (SNCR) process developed at Nalco Fuel Tech. (NFT). A data set was collected using in-situ measurements of NO, CO, and $NH_3$ by FT-IR and for six process setpoints and the transition periods between the setpoints.

A typical ANN is made up of three layers of processing units (nodes) and weighted connections between the layers of nodes. The input data are introduced at the input layer and are fed to the hidden layer through the weighted connections. As discussed by Psichogios and Ungar, ANNs have typically been used as "black-box" tools; i.e., assuming no prior knowledge of the process being modeled. One variation of this approach is to create a hybrid ANN which combines a known first principles model with a neural network model. This makes the ANN more robust and easier to train. An approach for future examination is to use the FG-DVC model for the mixed waste stream as the first principles model and develop a hybrid ANN model to describe the pyrolysis reactor.

Figure 4:
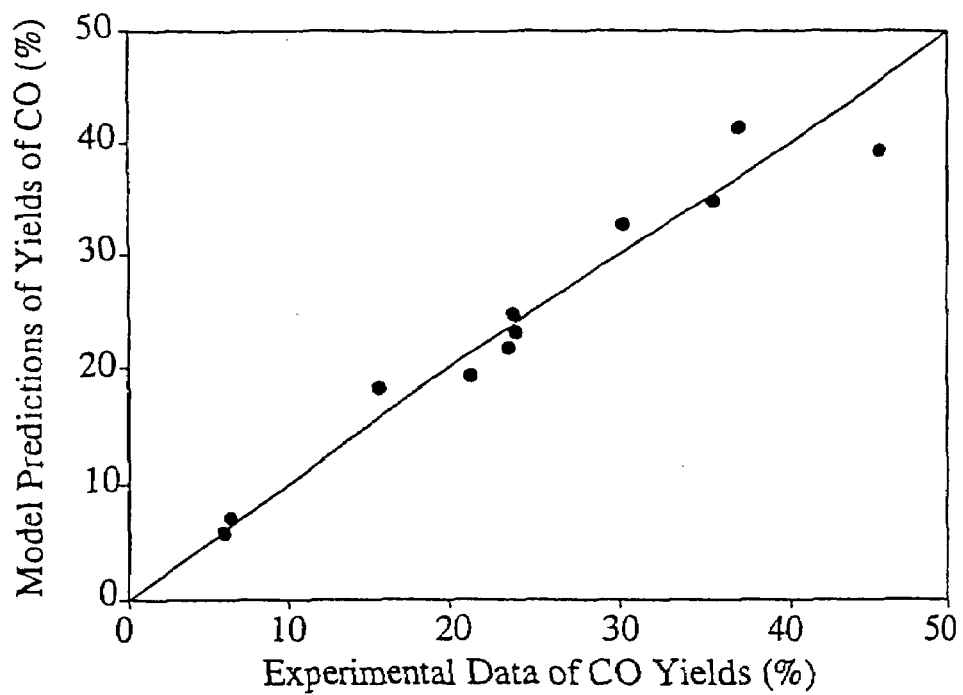
FIG. 4 is a plot comparing measured and ANN model predicted CO yields for post-pyrolyzer experiments with the composite mixture under slow and fast flow conditions.
Figure 5:
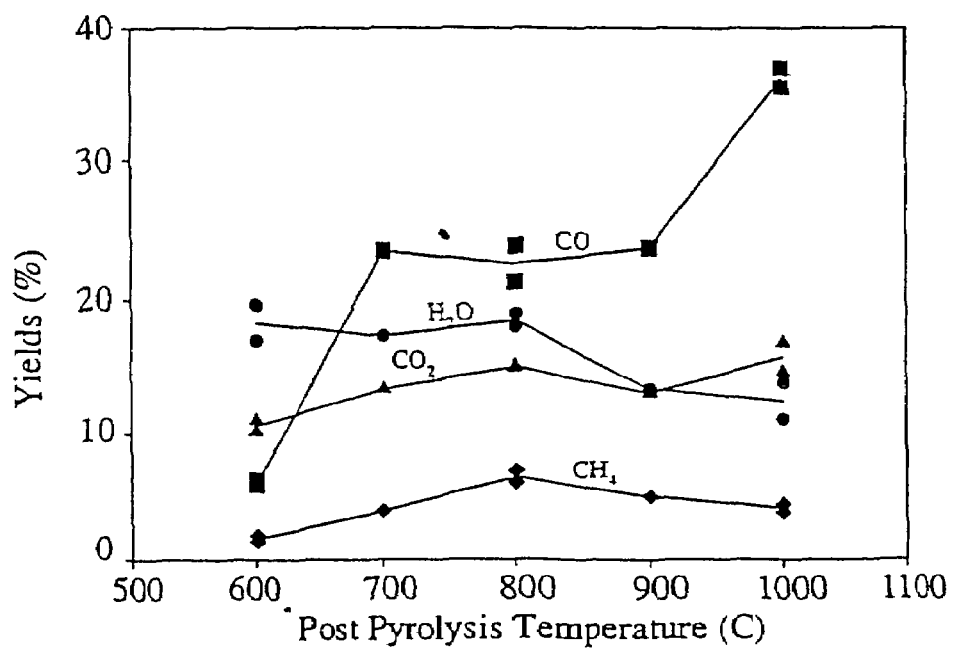
FIG. 5 is a plot comparing ANN model predictions (lines) and measured yields (symbols) of major gas products for post-pyrolyzer experiments with the composite mixture under the fast flow conditions.

ANN modeling results—A prerequisite to testing of the concept of using an ANN as the basis for a control scheme is that an ANN must first be able to model the important inputs and outputs in a system. In order to test this idea, yields of CO for the composite sample from the post-pyrolyzer experiments were calculated using a back-propagation neural network model. Five sets of test data (at 600, 700, 800, 900, 1000° C.) were divided into training and test sets for the neural network model. The results of model predictions for CO based on a training set using the data in Table 2 are shown in FIG. 4. FIG. 5 compares the predicted and measured product yields for all of the "fast flow" experiments with the composite mixture. In this case, the model was trained on the average results and then used to predict the individual results. The fact that the gas yields can be well correlated using ANN methods implies that monitoring 3-4 gases will be adequate to control the process and that the inability of IR methods to measure hydrogen will not be a problem.

Figure 6:
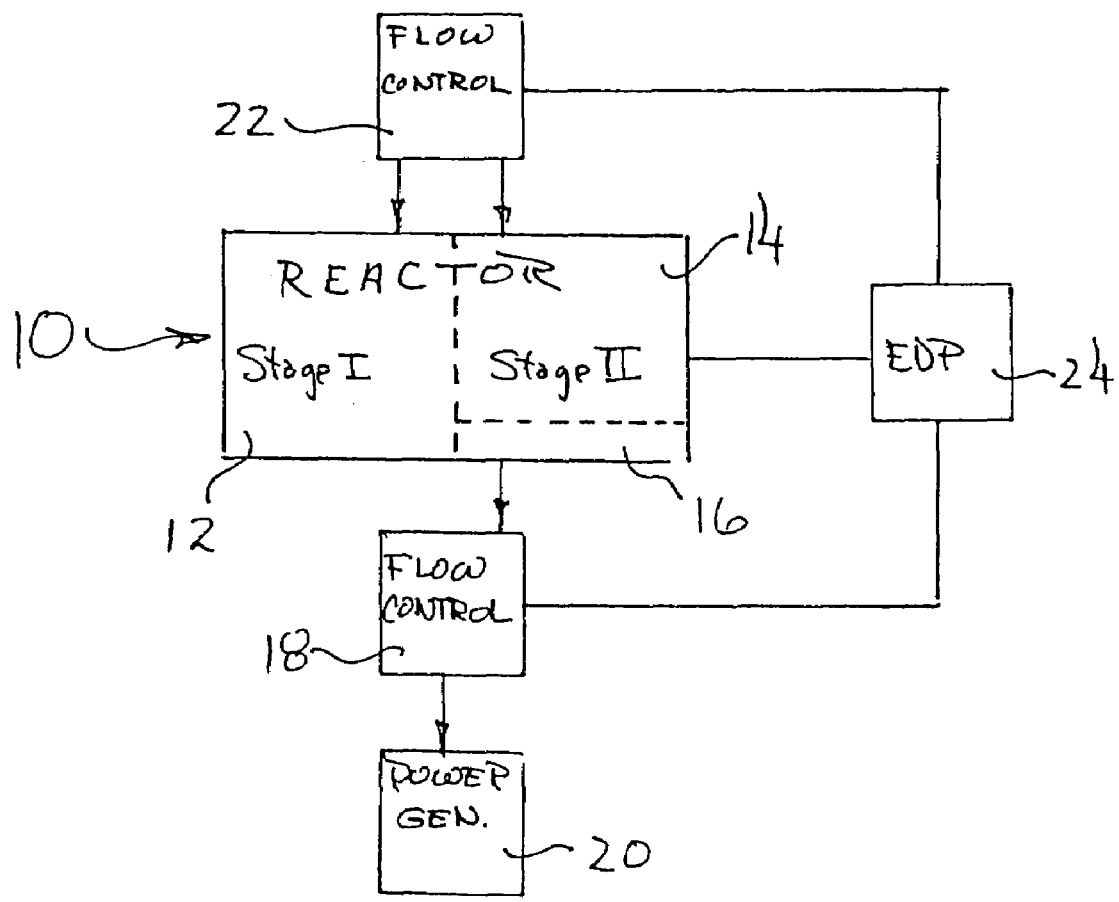
FIG. 6 is a diagrammatic representation of a power generation system embodying the present invention.

FIG. 6 diagrammatically illustrates a system embodying the present invention. The reactor, generally designated by the numeral 10, consists of a first stage, comprised of chamber 12, for effecting pyrolysis, operatively connected to a second stage, comprised of chamber 14 and containing a bed 16 of silica gel-based catalyst. Fuel gas withdrawn from chamber 14 is passed through a flow-control unit 18 (which may be a valve, a holding tank, etc.), and thereafter passes to a power generator 20 (e.g., a fuel cell, an internal combustion engine, a Stirling engine, or a thermophotovoltaic (TPV) system). Flow rates of gases (e.g., $O_2$, $CO_2$ and $H_2O$) into the reactor 10 are controlled by a bank 22 of flow controllers, and overall control of those flow rates and of the flow rate of gases out of the reactor 10, as well as of temperatures and other process conditions within the reactor, are monitored and controlled by an electronic data processing unit (EDP) 24, programmed as herein set forth.

Conclusions

The feasibility of pyrolyzing a representative composite mixture of mixed solid waste materials, and producing usable gases ($CH_4$, $H_2$, $CO_2$, CO, $H_2O$, $NH_3$) as the main products, and a reactive carbon-rich char as the main byproduct, have been demonstrated. Significant amounts of liquid products are formed under less severe pyrolysis conditions, but these were cracked almost completely to gases as the secondary pyrolysis temperature was raised. A primary pyrolysis model was developed for the composite mixture based on an existing model an for whole biomass materials, and an ANN model was used successfully to model the changes in gas composition with pyrolysis conditions. It is demonstrated that pyrolysis processing meets the requirements of solid waste resource recovery in space; i.e., it produces usable byproducts, with minimal side products which can be tailored to meet changes in the feedstock composition and the product requirements, significantly reduces storage volume, requires low maintenance, can be conducted as a batch, low-pressure process, and is compatible with the utilities that are present on board a spacecraft (electricity and small amounts of $O_2$ and $H_2O$). Although the pyrolysis gases may require further treatment, such as water gas shift conversion to remove CO, before they can be vented into the cabin, these gases could be introduced into an incinerator or a high temperature fuel cell system with minimal pretreatment.

A prototype waste pyrolysis system, related to the present invention, would be useful to NASA in at least four respects: 1) it can be used as a pretreatment for an incineration process; 2) it can be used as a more efficient means of utilizing oxygen and recycling carbon and nitrogen; 3) it can be used to supply fuel gases to fuel cells for power generation; and 4) it can be used as the basis for the production of chemicals and materials in space.

The invention addresses an important problem for long term space travel activities; i.e., closed loop regenerative life support systems. While the problem of solid waste resource recovery has been studied for many years, there is currently no satisfactory waste disposal/recycling technology. Pyrolysis processing is a very versatile technology, as discussed above, and can accommodate long term needs for a CELSS. Unlike incineration, the issue of $CO_2$ management can be largely decoupled from the issue of waste management.

Thus, it can be seen that the present invention provides a novel process and system by which non-gaseous hydrocarbonaceous materials, and particularly mixed solid waste materials, can be converted to usable gases as the main products, and to a reactive carbon-rich char as the main byproduct. The process is feasible for use in a controlled ecological life support system, and enables the provision of such a system.

Having thus described the invention, what is claimed is:

1. A process for producing fuel gases from at least one non-gaseous hydrocarbonaceous material, using a two-stage reaction apparatus, comprising the following steps, at least steps (b), (c), (d), and (e) being carried out cyclically:
    (a) introducing a non-gaseous hydrocarbonaceous material into a pyrolysis chamber, comprising a first stage of the apparatus;
    (b) pyrolyzing said hydrocarbonaceous material in said first stage pyrolysis chamber so as to produce a primary fuel gas mixture, a pyrolysis liquid, and a first carbonaceous residue;
    (c) introducing said primary fuel gas mixture and pyrolysis liquid into a second chamber, comprising a second stage of the apparatus and containing a catalyst, and heating said liquid therein, in a substantially non-oxidizing atmosphere, to a temperature of 900° to 1100° C. and substantially above the temperature at which pyrolysis is effected in step (b), so as to produce additional fuel gases and additional solid carbonaceous residue, without substantially altering the composition of said primary fuel gas mixture;
    (d) withdrawing said primary fuel gas mixture and said additional fuel gas from said second chamber; and
    (e) introducing air, oxygen, carbon dioxide or steam into each of said chambers to effect reaction with, and at least partial removal of, said carbonaceous residue therein.

2. The process of claim 1 wherein said carbonaceous material is heated to a temperature of about 500° to 600° C. in said pyrolysis step (b), wherein said primary fuel gas mixture consists primarily of carbon monoxide, methane, and hydrogen, and wherein said catalyst in said second chamber is a silica-gel based catalyst.

3. The process of claim 1 wherein steam, carbon dioxide, or a mixture thereof is introduced into each of said chambers in said step (e) so as to produce a further quantity of fuel gas.

4. The process of claim 1 wherein said introducing step (e) effects regeneration of said catalyst in said second chamber.

5. The process of claim 1 wherein said steps (b), (c), (d) and (e) are controlled by electronic data processing means programmed to monitor the formation of at least one gas phase product.

6. The process of claim 5 wherein said at least one gas phase product is selected from the group consisting of hydrogen, methane, carbon monoxide, carbon dioxide, water, and oxygen.

7. The process of claim 5 wherein the formation of at a least three gas phase products are monitored for controlling said steps.

8. The process of claim 7 wherein said data processing means is programmed to determine the concentrations of said at least three gas phase products.

9. The process of claim 8 wherein said data processing means is programmed to produce a fuel gas product of selected composition, from a specified hydrocarbonaceous material, by controlling the operating parameters for said first and second stages of the said apparatus.

10. The process of claim 1 wherein said process is a batch process.

11. The process of claim 2 wherein said catalyst in said second chamber is a fixed bed of silica gel-based catalyst.

12. The process of claim 8 wherein said data processing means is additionally programmed to implement an artificial neural network model based upon the concentrations of said at least three gas phase products, said concentrations being utilized as input data to said neural network.

13. A batch process for producing fuel gases from at least one non-gaseous hydrocarbonaceous material, using a two-stage reaction apparatus, comprising the following steps, at least steps (b), (c), (d) and (e) being carried out cyclically:
    (a) introducing a non-gaseous hydrocarbonaceous material into a pyrolysis chamber, comprising a first stage of the apparatus:
    (b) pyrolyzing said hydrocarbonaceous material in said first stage pyrolysis chamber so as to produce a primary fuel gas mixture, a pyrolysis liquid, and a first carbonaceous residue;
    (c) introducing said primary fuel gas mixture and pyrolysis liquid into a second chamber, comprising a second stage of the apparatus and containing a non-consumable catalyst, and heating said liquid therein, in a substantially non-oxidizing atmosphere, to a temperature of 900° to 1100° C. and substantially above the temperature at which pyrolysis is effected in step (b), so as to produce additional fuel gases and additional solid carbonaceous residue, without substantially altering the composition of said primary fuel gas mixture;

(d) withdrawing said primary fuel gas mixture and said additional fuel gas from said second chamber; and (e) introducing air, oxygen, carbon dioxide or steam into each of said chambers to effect reaction with, and at least partial removal of, said carbonaceous residue in said chambers, said steps (b), (c), (d) and (e) being controlled by electronic data processing means programmed to monitor the formation of at least one gas phase product.

14. The process of claim 13 wherein said at least one gas phase product is selected from the group consisting of hydrogen, methane, carbon monoxide, carbon dioxide, water, and oxygen.

15. The process of claim 13 wherein the formation of at least three gas phase products are monitored for controlling said steps (b), (c), (d) and (e).

16. The process of claim 15 wherein said data processing means is programmed to determine the concentrations of said at least three gas phase products.

17. The process of claim 13 wherein said data processing means is programmed to produce a fuel gas product of selected composition, from a specified hydrocarbonaceous material, by controlling the operating parameters for said first and second stages of the said apparatus, and to effect said process in closed-loop mode.

18. The process of claim 13 wherein said catalyst in said second chamber is a fixed bed of silica gel-based catalyst.

* * * * *

UNITED STATES PATENT AND TRADEMARK OFFICE
CERTIFICATE OF CORRECTION

PATENT NO. : 7,241,323 B2
APPLICATION NO. : 11/328921
DATED : July 10, 2007
INVENTOR(S) : Michael A. Serio et al.

It is certified that error appears in the above-identified patent and that said Letters Patent is hereby corrected as shown below:

In Claim 7, column 14, line 29, the word "a" should not be present.

Signed and Sealed this

Fifteenth Day of April, 2008

JON W. DUDAS
*Director of the United States Patent and Trademark Office*